US 8,849,054 B2

(12) United States Patent
Liu (10) Patent No.: US 8,849,054 B2
(45) Date of Patent: Sep. 30, 2014

(54) DIGITAL IMAGE STABILIZATION (75) Inventor: Erwin Sai Ki Liu, San Carlos, CA (US)

(73) Assignee: Samsung Electronics Co., Ltd, Suwon-Si, Gyeonggi-Do (KR)

( * ) Notice: Subject to any disclaimer, the term of this patent is extended or adjusted under 35 U.S.C. 154(b) by 107 days.

(21) Appl. No.: 13/313,715

(22) Filed: Dec. 7, 2011

(65) Prior Publication Data
US 2012/0162451 A1  Jun. 28, 2012

Related U.S. Application Data (60) Provisional application No. 61/426,970, filed on Dec. 23, 2010, provisional application No. 61/426,975, filed on Dec. 23, 2010.

(51) Int. Cl.
| G06K 9/40 | (2006.01) |
| H04N 5/228 | (2006.01) |
| H04N 5/232 | (2006.01) |
| H04N 5/14 | (2006.01) |

(52) U.S. Cl.
CPC ........... *H04N 5/145* (2013.01); *H04N 5/23254* (2013.01)
USPC ................... 382/260; 348/208.99; 348/208.4; 348/208.6; 348/222.1; 382/254; 382/255

(58) Field of Classification Search
USPC .............. 348/207.99, 207.1, 208.99–208.16, 348/222.1, 239, 241, 699; 382/103, 382/254–255, 260–265, 274–308; 396/52–55
See application file for complete search history.

(56) References Cited

U.S. PATENT DOCUMENTS

| 5,446,501 | A | 8/1995 | Takemoto et al. |
| 5,608,458 | A | 3/1997 | Chen et al. |
| 5,714,918 | A | 2/1998 | Menkhoff |
| 6,424,676 | B1 | 7/2002 | Kono et al. |
| 6,788,819 | B1 | 9/2004 | Swann et al. |
| 7,043,058 | B2 * | 5/2006 | Cornog et al. ................ 382/107 |
| 7,447,337 | B2 * | 11/2008 | Zhang et al. .................. 382/107 |
| 8,508,605 | B2 * | 8/2013 | Dolgin et al. .............. 348/208.4 |
| 2002/0044693 | A1 | 4/2002 | Ogawa |
| 2002/0150161 | A1 * | 10/2002 | Baese et al. .............. 375/240.17 |
| 2002/0154695 | A1 * | 10/2002 | Cornog et al. ........... 375/240.16 |
| 2002/0171759 | A1 | 11/2002 | Handjojo et al. |
| 2003/0235248 | A1 | 12/2003 | Kim et al. |
| 2004/0001147 | A1 * | 1/2004 | Vella et al. ............... 348/208.99 |
| 2004/0076333 | A1 | 4/2004 | Zhang et al. |
| 2004/0252895 | A1 * | 12/2004 | Hur et al. ...................... 382/236 |
| 2005/0105627 | A1 | 5/2005 | Sun et al. |
| 2005/0163348 | A1 | 7/2005 | Chen |
| 2006/0061658 | A1 | 3/2006 | Faulkner et al. |
| 2006/0153472 | A1 * | 7/2006 | Sakata et al. .................. 382/255 |
| 2006/0228049 | A1 | 10/2006 | Gensolen et al. |
| 2006/0256238 | A1 * | 11/2006 | Mishima et al. ............. 348/459 |
| 2007/0116125 | A1 * | 5/2007 | Wada et al. .............. 375/240.16 |
| 2007/0288141 | A1 | 12/2007 | Bergen et al. |
| 2008/0144124 | A1 | 6/2008 | Samadani et al. |

(Continued)

Primary Examiner — Michael Osinski
(74) Attorney, Agent, or Firm — F. Chau & Associates, LLC

(57) ABSTRACT

A Digital Image Stabilization method including selecting a principal transform representing a stationary/background object in the scene of a video frame, based on scoring each of a plurality of transforms of tile motion vector (Tile MV) groups and of feature point motion vector (FP MV) groups, and excluding large moving objects based on the history of the stationary (background) group and the history of each of the plurality motion vector groups.

24 Claims, 8 Drawing Sheets

Detection unit.

Trajectory unit block diagram.

(56) References Cited

U.S. PATENT DOCUMENTS

| | | |
|---|---|---|
| 2008/0246848 A1 | 10/2008 | Tsubaki et al. |
| 2008/0273806 A1 | 11/2008 | Friedrichs et al. |
| 2008/0291285 A1* | 11/2008 | Shimizu .................... 348/208.6 |
| 2009/0028462 A1 | 1/2009 | Habuka et al. |
| 2009/0103620 A1* | 4/2009 | Lee et al. ................. 375/240.16 |
| 2009/0161827 A1 | 6/2009 | Gertner et al. |
| 2010/0074531 A1* | 3/2010 | Tanaka .......................... 382/201 |
| 2010/0118156 A1 | 5/2010 | Saito |
| 2010/0157073 A1* | 6/2010 | Kondo et al. ............. 348/208.4 |
| 2010/0208087 A1 | 8/2010 | Ogawa |
| 2010/0220788 A1 | 9/2010 | Wittmann et al. |
| 2010/0245664 A1* | 9/2010 | Wu et al. ...................... 348/441 |
| 2010/0260437 A1* | 10/2010 | Nguyen et al. ................ 382/275 |
| 2010/0271494 A1 | 10/2010 | Miyasako |
| 2011/0085049 A1* | 4/2011 | Dolgin et al. ............... 348/208.4 |
| 2011/0235942 A1* | 9/2011 | Luo et al. ...................... 382/275 |
| 2011/0293195 A1* | 12/2011 | Nakagami et al. ............ 382/233 |
| 2011/0307537 A1 | 12/2011 | Hirayama |
| 2012/0147963 A1* | 6/2012 | Sato ........................ 375/240.16 |
| 2012/0162449 A1 | 6/2012 | Braun et al. |
| 2012/0162450 A1 | 6/2012 | Park et al. |
| 2012/0162451 A1 | 6/2012 | Liu |
| 2012/0162452 A1* | 6/2012 | Liu ............................ 348/208.4 |
| 2012/0162454 A1* | 6/2012 | Park et al. .................. 348/208.6 |
| 2012/0162475 A1 | 6/2012 | Lin et al. |
| 2012/0169894 A1* | 7/2012 | Numata et al. ........... 348/208.99 |
| 2012/0219229 A1* | 8/2012 | Springer et al. .............. 382/199 |
| 2012/0294492 A1* | 11/2012 | Kamei et al. .................. 382/107 |
| 2013/0033612 A1* | 2/2013 | Wu et al. .................... 348/208.6 |
| 2013/0083851 A1* | 4/2013 | Alshin et al. ............. 375/240.14 |
| 2013/0128974 A1* | 5/2013 | Chien et al. .............. 375/240.15 |

* cited by examiner

FIG. 1 Digital image stabilization circuit block diagram.

FIG. 2 Detection unit.

FIG. 3 Trajectory unit block diagram.

FIG. 4A Group transform scoring and selection block diagram.

FIG. 4B History score calculation unit.

FIG. 5   Collective transform scoring and selection block diagram.

FIG. 6 Moving object exclusion method block diagram.

FIG. 7 Motion group history circuit.

DIGITAL IMAGE STABILIZATION

CROSS-REFERENCE TO RELATED APPLICATION

This application claims priority under 35 U.S.C. §120 to U.S. Provisional Application Nos. 61/426,970, and 61/426,975, both filed in the U.S. Patent and Trademark Office on Dec. 23, 2010. The disclosures of both provisional applications are incorporated by reference herein.

1. TECHNICAL FIELD

The present inventive concept relates to digital image-stabilization (DIS), and more particularly, to methods of identifying movement of objects in a camera scene and distinguishing between intended and unintended movement of the camera.

2. DISCUSSION OF THE RELATED ART

Digital cameras, digital video cameras and hand-held devices including such cameras capture are often employed to capture images or video while the camera is operated in the hand of a human operator. Thus, the video camera may be shaking or jittering in the operators hand while capturing the image or video. The jitter may include a horizontal component, a vertical component, and a rotational component. The jitter may make the hand-captured video distracting or disorienting for the viewer, and this it is desirable to use digital circuits to digitally estimate camera trajectory (i.e., the jitter as detected between each pair of consecutive frames) and to filter out the jitter from a sequence of video frames of the same scene.

The video produced by a steady, either stationary or moving video camera contains mainly smooth motions (translation, rotation) in the captured video. On the other hand, an unsteady video camera produces video with high frequency jitter (translational and/or rotational) throughout the video images.

A digital image stabilization (DIS) system first estimates unwanted (unintended) motion and then applies corrections to the image sequence. The visual effect of a stabilized video is highly dependent on the quality of camera trajectory estimation. Conventional digital image stabilization (DIS) methods use identified feature points as the basis for estimating the jittery motion between two consecutive frames. Thus, in conventional DIS technology, jittery camera movement is detected by calculating the vectors of the motion of identifiable "feature points" between timewise adjacent frames. The calculated motion vectors of feature points are then "grouped" for the purpose of associating a plurality of motion vectors with actual objects within the scene. This grouping allows small moving objects in the scene to be distinguished from global motion of the camera/scene. The global motion of the camera/scene is analyzed to distinguish between intended (e.g., panning) and unintended (jittery) global motion.

It is also desirable to detect and measure the camera's trajectory and characterize the jitter accurately so that the jitter may be correctly compensated for and correctly removed from the stored/displayed video. However, in some special cases such as high noise or flat scene videos, feature point tracking may be unreliable. To obtain feature-point motion vectors, the most matching point has to be found based on the (sum of absolute differences) SAD calculations. But the minimum SAD does not always guarantee the right matching points, such as in low-light conditions of high noise, or with flat scenes such as a blue sky.

In mathematics, affine geometry is the study of geometric properties which remain unchanged by affine transformations, i.e. non-singular linear transformations and translations. A mathematical system of equations defined by numerical coefficients, called an Affine matrix, has been developed to characterize the lateral (up/down), rotational, and scalar (e.g., zoom in or zoom out) of movement detected between each pair of consecutive frames or between portions thereof (e.g., moving objects in the frames). Thus, Affine transforms $T_i(n)$ may serve as compact descriptions of the motion of an identified group of selected features visible in an image, where each feature is a distinctive point in a video frame image. This mathematical description of the group can contain linear displacement, rotation angle, scale, etc. The linear displacement motion $M_i(n)$ of each group is a subset of the information in the Affine transforms $T_i(n)$ for multiple frames (n−1, n, n+1, etc.).

Thus, the camera jitter may be characterized by a first Affine transform matrix related to any actually-stationary objects (e.g., rocks, tables, parked cars, mountains, the sun) in the scene, called a Principal transform P(n), or Global Transform, while any moving objects (e.g., birds, people, balls, moving cars, passing trains) in the frame may be characterized by additional Affine matrices. Transforms with small motion $M_i(n)$ are more likely to be the principle transform P(n). But, the transform with smallest motion $M_i(n)$ is not necessarily always the principle transform P(n).

The Principal transform (principle inter-frame transform) P(n) indicating camera motion (e.g., caused by the user's hand jitter) is computed and selected by detecting one or more points of interest ("feature points"). Motion vectors of feature points between consecutive frames can be computed using various search methods employed in the field of video compression. A plurality of feature point motion vectors associated (grouped) with a particular object are then used to compute the Affine Transform of that object, which defines its detected motion according to the Affine equation.

To stabilize an image, the principle motion caused by unsteady camera is distinguished from moving objects in the scene. If there is no jitter (no camera trajectory) then each detected Feature Points of actually-stationary objects (e.g., the corners of rocks, the peaks of mountains) will be expected to be found in the same location in each of two or more consecutive frames (and the motion vector of all those detected Feature Points will be measured as null). If there is jitter (camera trajectory) then each detected Feature Points of actually-stationary objects (e.g., the corners of rocks, the peaks of mountains) will be expected to be found in different locations in each of two or more consecutive frames, and the motion vector of all those detected Feature Points will be measured. But, in some scenes, a large moving object, e.g., a passing train or a passing truck having a measurable motion vector equal to, less than, or greater than the jittery motion may enter a frame and progressively cover more and more area of the frame until it covers the entire scene. Large moving objects that cover the entire video scene presents particular challenge to conventional DIS methods. The occurrence could likely confuse conventional DIS circuits which could misidentify the transform of the large moving object as the Principal transform P(n).

SUMMARY

An aspect of the inventive concept provides a Digital Image Stabilization (DIS) method that includes identifying a stationary background of a frame based on selecting a principal transform from among tile motion vector group transforms and feature point motion vector group transforms to distinguish the stationary background from actual moving objects.

An aspect of the inventive concept provides a Digital Image Stabilization method including selecting a Principal transform P(n) representing a stationary/background object in the scene of a video frame, based on scoring each of a plurality of transforms of tile motion vector (Tile MV) groups and of feature point motion vector (FP MV) groups, and excluding large moving objects based on the history of the stationary (background) group and the history of each of the plurality motion vector groups.

Another aspect of the inventive concept provides a method of selecting a Principal transform P(n) representing a stationary/background object in the scene of a video frame, based on scoring each of a plurality of transforms of feature point motion vector (FP MV) groups.

Another aspect of the inventive concept provides a method of selecting a Principal transform P(n) representing a stationary/background object in the scene of a video frame, based on scoring each of a plurality of transforms of tile motion vector (Tile MV) groups and of feature point motion vector (FP MV) groups.

Another aspect of the inventive concept provides a Digital Image Stabilization method including excluding large moving objects that may cover the entire video frame, based on the history of the stationary (background) group and the history of each of the plurality of motion vector groups.

An aspect of the inventive concept provides a Digital Image Stabilization circuit adapted to perform the herein disclosed DIS methods. The method or circuit employed to estimate camera trajectory between consecutive video frames and to filter out the jitter caused by the camera's trajectory from a sequence of video frames may be contained within a video camera itself, and activated to remove in real time the jitter prior to storage of the captured video frames (e.g., prior to or during MEPG encoding if the video camera includes a real-time MPEG encoder). Alternatively the DIS circuit employed to estimate camera trajectory between consecutive video frames and to filter out the jitter from a stored sequence of video frames may be a general purpose microcomputer controlled by software embodying a digital image stabilization (DIS) method, or may be a dedicated hardware, such as an MEPG video encoder embodied in an ASIC (application specific integrated circuit) optimized to perform a digital image stabilization (DIS) method.

A feature of exemplary embodiments of the inventive concept is a method of applying continuous scoring functions to evaluate the transform of each motion vector group among $T_i(n)$ and to select the best transform P(n) to represent the (stationary) background. The method simultaneously considers component functions including, but not limited to functions of transform history, transform motion, transform features, and transform extent (horizontal and vertical) in selecting the principle transform P(n). Each of these characteristics contributes to a scoring component. The ensemble of these scoring components gives a total score $Q_i(n)$ for each transform candidate $T_i(n)$. The inter-frame transform candidate with the highest total score $Q_i(n)$ is selected as the principle inter-frame transform P(n) and is used in subsequent compensation steps of the DIS method. The disclosed scoring and selection method is not sensitive to minor perturbations of the inter-frame transforms. Thus, the disclosed method is superior to conventional multi-level ad-hoc binary decision routines, which are very sensitive to such minor perturbations.

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. Like numbers refer to like elements throughout.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the figures.

DETAILED DESCRIPTION OF EXEMPLARY EMBODIMENTS

According to an embodiment of the present inventive concept, each captured video frame is divided into a small number of non-overlapping tiles (typically 4×4 tiles for Standard Definition and 6×6 tiles for High Definition), for the purpose of algorithmically selecting feature points providing a good feature point distribution suitable for digital image stabilization. Different regions of the image may have a different density of suitable feature points. In extreme cases, a region of the frame may not have any suitable feature points, for example in the case of a blue sky without any clouds. In other regions, the potential feature points might be very dense.

The obtained feature point distribution is based on small regions of the video frame, (e.g. non-overlapping tiles), where the number of feature points in each tile increases linearly with the variance $\sigma^2$ of the luminance image data of the tile. Tiles with more interesting image data and therefore the need for more feature points are expected to have a higher variance $\sigma^2$. See co-pending application Ser. No. 13/313,684, title "DIGITAL IMAGE STABILIZATION DEVICE AND METHOD", filed on even date of the present application, describing a process that sets a minimum distance (MIN_DIST) between feature points in each tile while at the same time requiring only little local state information, thereby reducing the hardware implementation cost. The disclosure of copending application Ser. No. 13/313,684, is incorporated-by-reference herein.

If the scene was captured at low light conditions, it will have relatively more noise, and the noise effect is greater to the feature points than the tiles, because the number of pixels of feature points is much smaller than the number of pixels in the tile. The larger number of pixels in the tile provides the noise cancellation effect, and the downsampled tile-based motion vector is more accurate in this case.

Even if the scene is not captured in the low light condition, if the scene is too flat, the tile-based motion vector can be more accurate. If the tile scene is very flat like a cloudy sky or blue sky, there can be some feature points and these feature points in the flat tile can find similar levels of matching points at many places in the next frame. But, the tile-based matching does not rely only on a small feature-point search area, and all the patterns in the tile can contribute to the tile matching process. As a result, the tile-based motion vectors are more reliable when the scene is flat.

When the best score of feature point motion vector groups is smaller than a given threshold, we decide to use tile-based motion vectors instead of feature-point based motion vectors, and this strategy works well for the scenes of high noise or flat scenes.

According to an embodiment of the inventive concept, we choose the estimated motion vectors representing the movement of the background and large objects, whereas smaller objects do not need to have an accurate motion vector associated with them. Any inaccurate vectors for smaller objects can be filtered at a later stage of the DIS algorithm.

It is expected that feature points of the large stationary objects of significance will move in a coherent way because of global movement or camera movement. We recognize that sufficiently large objects that move independently cover the majority of at least one tile, so that their motion can be estimated as the predominate motion of the tile itself, while the motion of small objects has little effect on the motion vector of the tile itself.

We derive one motion vector per tile, using block matching on the lowest resolution. The tile-based motion vectors can be used for the camera trajectory decisions in some special cases such as high noise or flat scene videos.

The motion vector for a given tile is the one that minimizes the sum of absolute differences (SAD). And, the process of calculating motion vectors of feature points in each tile may be modified to reduce computations, by using a hierarchical motion estimation algorithm and by preferring tile movement over local movement, using the motion vector of the tile as a start vector. Because a sufficiently large object that covers the majority of at least one tile may extend into adjacent tiles, it is probable that some feature points in each tile may be associated more strongly with the motion vector of an adjacent tile rather than the motion vector of the tile they are found within. Thus, it would be effective to use the motion vectors of all the adjacent tiles as multiple start vectors in the block matching search for the motion vector of the feature points of any given tile. Thus the start vectors used to obtain motion vectors of the selected feature points are those of the tile the feature point belongs to as well as those belonging to the four direct neighbors (Upper tile, Left tile, Right tile, Lower tile), provided it exists. For each start vector used, we only use a very small range for the local search for feature point motion vectors. The goal here is not so much to determine accurate vectors for each and every feature point (bad motion vectors will be sorted out later in the DIS processing chain). Rather, the feature points of interest are only those that belong to the background or large objects. For those feature points, one of the tile motion vectors should be good, or close to the motion vector of the feature points of interest, and therefore, a small local search about each selected tile motion vectors is sufficient. A small local block matching search is performed in a higher-resolution domain (this could be the original video resolution, or subsampled by a factor $f_{s3}$ of 2 or 4) around each of a set of start vectors for every selected feature point in the tile.

Figure 1:
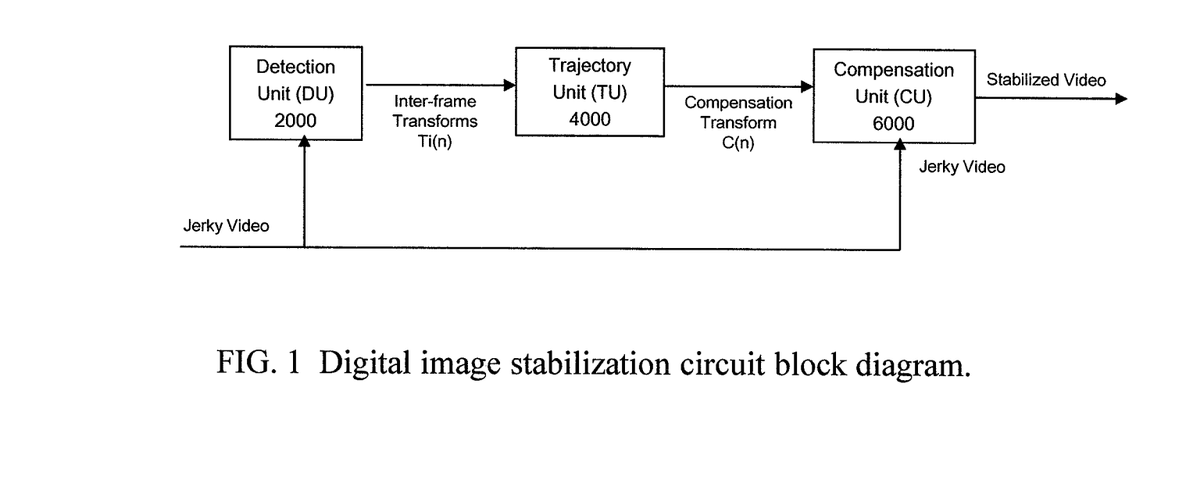
FIG. 1 is a block diagram of a Digital Image Stabilization (DIS) circuit performing a DIS method in accordance with an exemplary embodiment of the inventive concept.

FIG. 1 is a block diagram of Digital Image Stabilization (DIS) circuit performing a DIS method in accordance with an exemplary embodiment of the inventive concept. The DIS circuit comprises a Detection Unit (DU) that analyses received jerky video and outputs inter-frame transforms $T_i(n)$, a Trajectory Unit (TU) that outputs a selected Principal/compensation transform P(n) selected from among the inter-frame transforms $T_i(n)$, and a Compensation Unit (CU) that outputs stabilized video by modifying the jerky video using the selected Principal/compensation transform P(n).

The Detection Unit (DU) estimates inter-frame motion vectors of feature points (FP) and inter-frame motion vectors of non-overlapping tiles (Tile vectors) in a received frame of video data. The Detection Unit further outputs FP motion vector group transforms and tile vector group transforms $T_i(n)$.

The Trajectory Unit (TU) selects one of the inter-frame transforms $T_i(n)$, (or Unity Transform in a case where a large moving object covers the scene) as the Principal Transform P(n), thus excluding the inter-frame transforms of small moving objects and of a large moving object that may move into and cover the entire frame.

Figure 2:
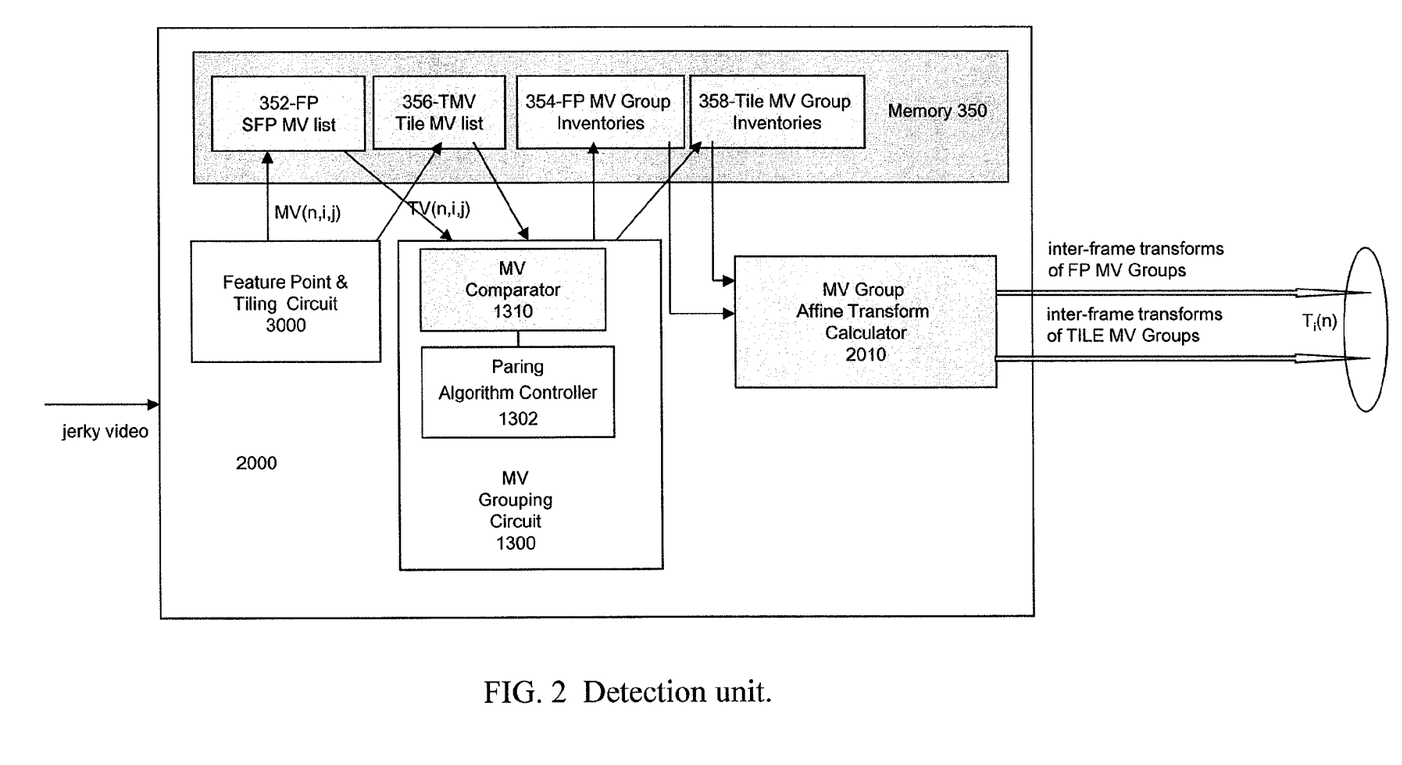
FIG. 2 is a block diagram of a Detection Unit in the DIS circuit of FIG. 1 adapted to calculate the affine transforms of tile vector groups.

FIG. 2 is a block diagram of the Detection Unit 2000 in the DIS circuit of FIG. 1 adapted to calculate the affine transforms of tile vector groups as steps of the DIS method of the DIS circuit of FIG. 1. The Detection Unit 2000 comprises a Feature Point Circuit 3000, an motion vector (MV) Grouping Circuit 1300, and a motion vector (MV) Group Affine Transform Calculator 2010.

The Feature Point Circuit 3000 receives each frame of video data and preferably divides each video frame into a small number j×k of non-overlapping tiles. The number j×k of tiles can range from 4×4 for SD video to 6×6 for HD video; other numbers in the range from (4 . . . 8)×(4 . . . 8) are also possible and may be beneficial. The tile size is chosen such that sufficiently large objects that move independently cover the majority of at least one tile, so that their motion can be captured for DIS purposes, while the motion of small objects may be ignored. Feature Point Circuit 3000 identifies and selects feature points (SFPs) in a received video frame, and outputs the motion vectors of feature points and of tiles (SFP MVs and Tile MVs).

The Feature Point Circuit 3000 comprises a Feature Point Selector and a Motion-Vector Calculator and a shared RAM Memory 350. The Feature Point Selector 300 may further comprise a Harris-Corner Feature Point Candidate Identifier, and a Feature Point Candidate Sorter. To save computational power and to reduce the number of required operations, the Feature Point Circuit 3000 operates only on luma data, and comprises one or more Downsamplers and a Hierarchical Block-Matching Search Unit.

The Feature Point Circuit 3000 estimates one motion vector for every tile. Tile motion vector (Tile MV) estimation is done on the basis of non-overlapping tiles that cover the center of the input image (e.g., the same tiles that may used in a feature point sorting algorithm). For each of the tiles, a full blockmatching search is performed on a deeply downsampled image. A full-search block matching is done for every tile and the tile motion vector (Tile MV) is stored (356) for later use, e.g., as a start vector in the Hierarchical Block-Matching Search Unit for deriving the motion vectors of the feature points (SFP MV stored at 352) and for stationary-object detection.

The Feature Point Circuit 3000 preferably provides a list of feature points 352 having a distribution based on small regions (tiles) of the video frame, called tiles, where the maximum number of feature points per tile increases linearly with the variance $\sigma^2$ of the luminance image data of the tile. Good feature points for the DIS method are points that yield non-ambiguous motion vectors when a suitable motion estimation algorithm is applied. To identify feature points in an image, a Harris Corner Detection algorithm is applied to pixels of a video frame to measure how well suited this pixel is as a feature point. Different regions (tiles) of the image may have a different density of identified feature point candidates.

The Feature Point Circuit 3000 preferably includes a Motion-Vector Calculator that performs the function of a Tile-Vector Calculator for calculating each tile's motion vector, and a Hierarchical Block-Matching Search Unit to determine and output the motion vector of each Selected Feature Point (SFP). The Tile-Vector Calculator calculates the motion vector of each tile using deeply downsampled luma data of the current frame $F_t$. Hierarchical Block-Matching Matching Search Unit determines the motion vector of each of the selected feature points using the full-resolution or downsampled luma data of two consecutive frames, and may use the Tile Vectors as start vectors.

All feature-point and tile related data is passed to the next DIS block, particularly the motion vector grouping circuit 1300.

The Motion Vector Grouping Circuit 1300 is configured to perform the grouping algorithm on the FP motion vectors and on the tile motion vectors. The Feature Point Grouping Circuit 1300 comprises a Motion Vector Comparator 1310 configured to perform grouping decisions by comparing each pair of vectors selected by the Paring Algorithm Controller 1302.

The Feature Point Grouping Circuit 1300 groups FP motion vectors to associate the motion vectors of selected feature points (SFPs) with objects in the scene based on the object's perceived relative movement between consecutive video frames. The Feature Point Grouping Circuit 1300 also groups Tile motion vectors to associate the Tile vectors with objects in the scene based on the object's perceived relative movement between consecutive video frames.

The Feature Point Grouping Circuit 1300 shares the RAM Memory 350 with the Feature Point Circuit 3000. The SPF MV list portion 352-FP of the memory 350 contains the list of locations and motion vectors of selected feature points (SFPs). The Tile MV list portion 352-TMV of the memory 350 contains the list of locations and motion vectors of the non-overlapping tiles.

The Paring Algorithm Controller 1302 keeps track of which feature points and tiles (motion vectors) have been already paired with which others, which remain unpaired, and which will be entirely excluded from grouping. The paring algorithm repeatedly provides pairs of motion vectors (vector A & vector B) as inputs to the MV Comparator 1310.

The Paring Algorithm Controller 1302 in the Feature Point Grouping Circuit 1300 accesses the SPF MV list (352-MV) and the Tile MV list (352-TMV) and selects vectors A and vectors B for comparison in the Motion Vector Comparator 1310. When series of vectorA-vectorB comparison results in one or more groups of vectors (e.g., groups of selected feature points and groups of tiles), the Paring Algorithm Controller 1302 writes the grouped motion vectors or a descriptive list thereof into the FP MV Group Inventories portion 354 and Tile MV Group Inventories portion 358 of the memory 350.

The motion vector (MV) Group Affine Transform Calculator 2010 calculates the inter-frame transform of each group of feature point motion vectors, and calculates the inter-frame transform of each group of tile motion vectors and outputs them all as $T_i(n)$.

Figure 3:
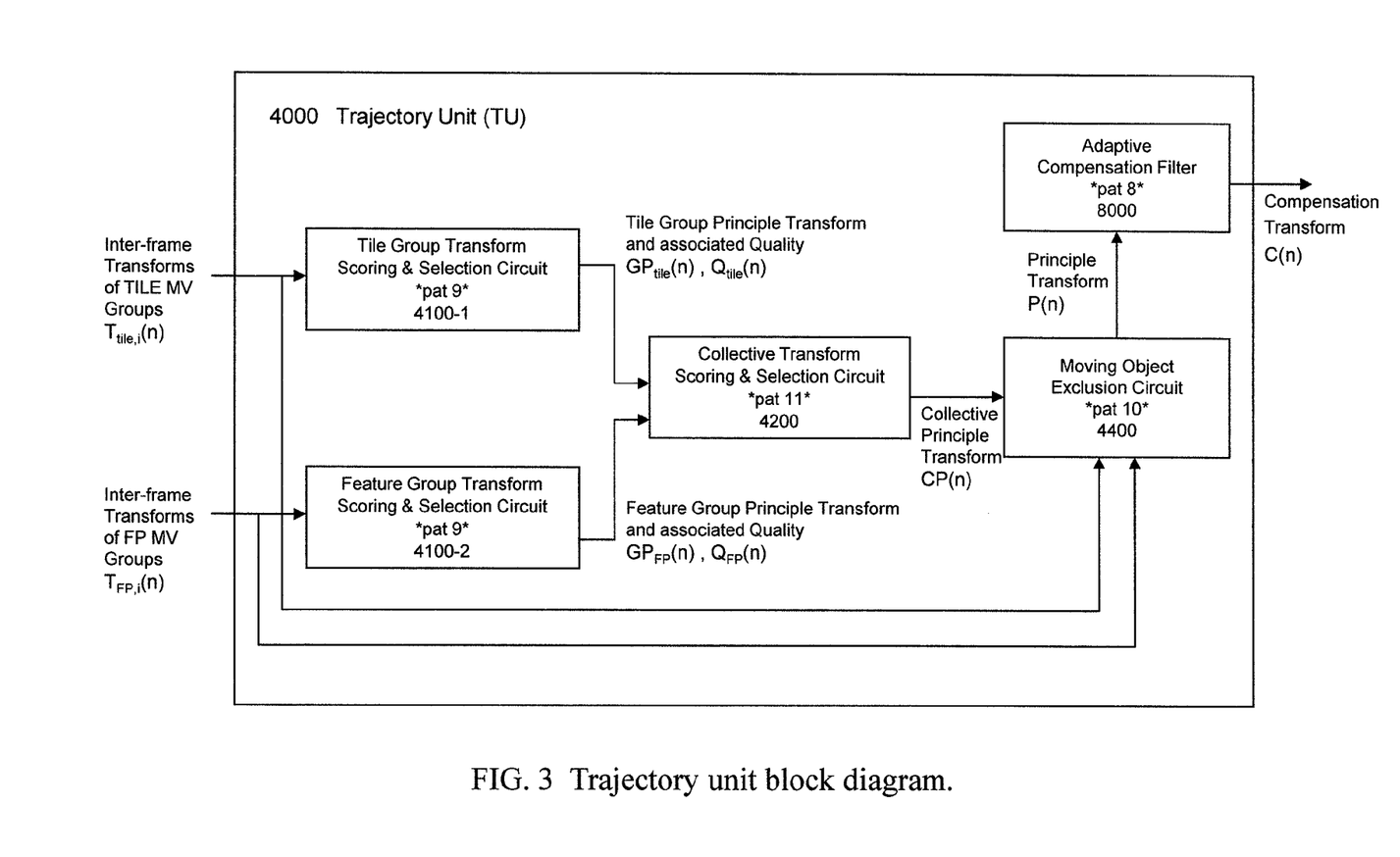
FIG. 3 is a block diagram of a Trajectory Unit (TU) of the DIS circuit of FIG. 1 adapted to select the principal (stationary/background) transform P(n) based on scoring tile group transforms and feature group transforms $T_i(n)$.

FIG. 3 is a block diagram of the Trajectory Unit (TU) 4000 of the DIS circuit of FIG. 1 adapted to select the principal (stationary/background) transform P(n) based on a method of scoring tile group transforms and feature group transforms $T_i(n)$, in accordance with steps of the DIS method of the DIS circuit of FIG. 1.

The Trajectory Unit (TU) 4000 (FIG. 3) comprises a Tile Group Transform Scoring and Selection Circuit 4100-1 (FIG. 4A), a Feature Group Transform Scoring and Selection Circuit 4100-2 (FIG. 4A), a Collective Group Selection Circuit 4200 (FIG. 5), a Moving Object Exclusion Circuit 4400 (FIG. 6), and an Adaptive Compensation Filter 8000 (FIGS. 10 and 11).

The Trajectory Unit (TU) 4000 identifies the principle motion P(n) caused by unsteady camera while ignoring moving objects in the scene, filters the selected Principal Transform P(n), and outputs the Compensation Transform C(n). The Trajectory Unit (TU) 4000 employs a plurality of continuous scoring functions to select the Principle Transform P(n) from among the received inter-frame transforms $T_i(n)$.

Figure 4A:
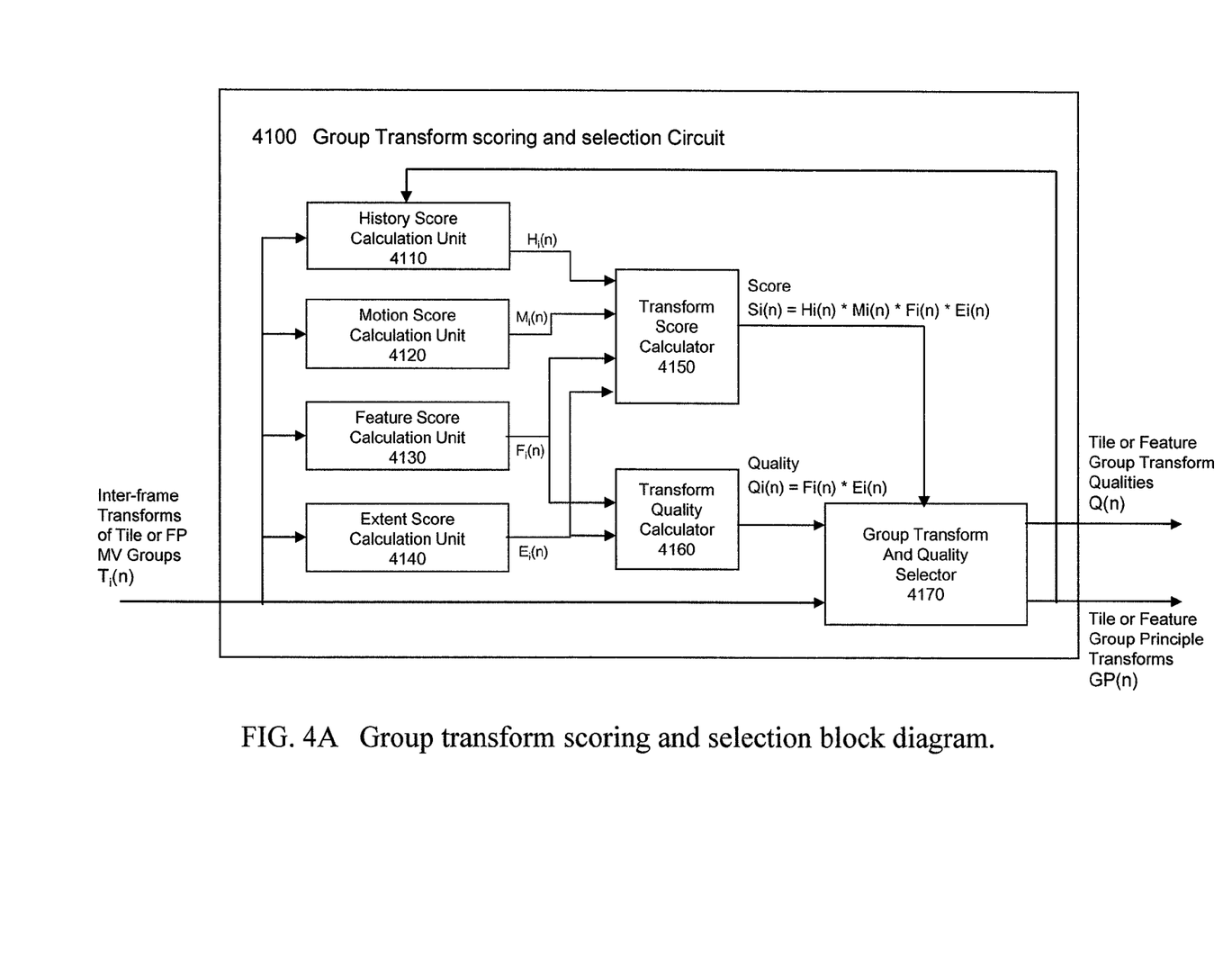
FIG. 4A is a block diagram of an exemplary implementation of a Group Transform Scoring And Selection Circuit configured to perform a step in the DIS method of the DIS circuit of FIG. 1.

FIG. 4A is a block diagram of the Group Transform Scoring and Selection Circuit 4100 of the Trajectory Unit (TU) 4000 of the DIS circuit of FIG. 1, comprising a Transform Score Calculator 4150, Transform Quality Calculator 4160, and a Group Transform and Quality Selector 4170 configured to perform a step in the DIS method of the DIS circuit of FIG. 1. The Group Transform Scoring and Selection Circuit 4100 is adapted to output the Tile Group Principle Transform $GP_{Tile}(n)$ from Tile Group Inter-frame Transforms $T_{Tile,i}(n)$ (4100-1), and adapted to output the Feature Group Principle Transform $GP_{FP}(n)$ from FP Inter-frame Transforms $T_{FP,i}(n)$ (4100-2).

Figure 4B:
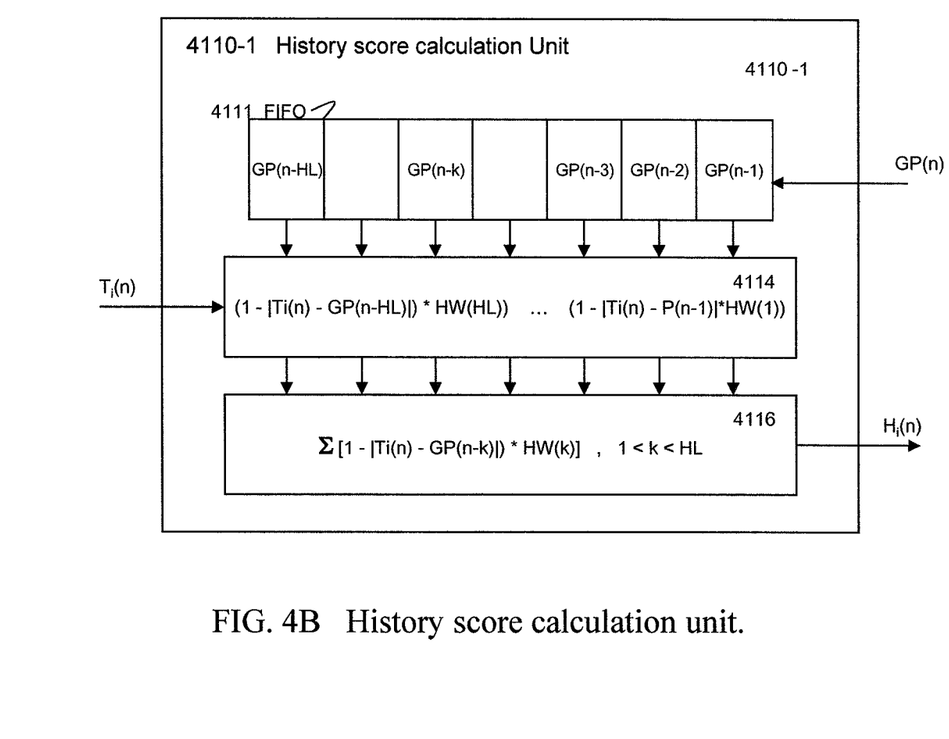
FIG. 4B is a block diagram of an exemplary implementation of the History Score Calculation Unit.

FIG. 4B is a block diagram of an exemplary implementation of the History Score calculation Unit 4110-1 in the Group Transform Scoring And Selection Circuit 4100 of FIG. 4A shown in the implementation 4100-1 thereof of FIG. 4.

Referring to FIGS. 4A and 4B, the Group Transform Scoring And Selection Circuit 4100 comprises a History Score Calculation Unit 4110 (e.g., 4110-1), a Motion Score Calculation Unit 4120, a Feature Score Calculation Unit 4130, and an Extent Score Calculation Unit 4140, plus a total Transform Score $S_i(n)$ Calculator 4150, a Transform Quality $Q_i(n)$ Calculator 4160, and a Group Transform and Quality Selector 4170 (e.g., 4170-1).

The Group Transform and Quality Selector 4170 of the Group Transform Scoring and Selection Circuit 4100 of FIG. 4A selects one of the inter-frame transforms $T_i(n)$ as the Group Principle Transform GP(n) (by rejecting the inter-frame transforms of small moving objects) based on the total Transform Score $S_i(n)$ (of each inter-frame transform $T_i(n)$) received from the total Transform Score Calculator 4150, and outputs the Group Principle Transform GP(n) and its associated Quality Q(n).

Let $T_i(n)$ be the $i^{th}$ transform out of all received Transform candidates received from the Detection Unit (DU) 2000, where n denotes a frame and the time sequence nature. Let GP(n) be the selected Group Principle Transform at frame time n, i.e., GP(n)=T$_i$(n) for a selected i.

For each T$_i$(n), the total Transform Score S$_i$(n) Calculator 4150 receives a History score H$_i$(n) from the History Score calculation Unit 4110 (e.g., 4110-1), receives a Motion score M$_i$(n) from the Motion Score calculation Unit 4120, receives a Feature score F$_i$(n) from the Feature Score calculation Unit 4130, and receives an Extent score E$_i$(n) from the Extent Score calculation Unit 4140, and calculates the total Transform Score S$_i$(n) based on the following equation:

$$S_i(n)=H_i(n)*M_i(n)*F_i(n)*E_i(n).$$

For each T$_i$(n), the Transform Quality Q$_i$(n) Calculator 4160 receives a Feature score F$_i$(n) from the Feature Score calculation Unit 4130, and receives an Extent score E$_i$(n) from the Extent Score calculation Unit 4140, and calculates the Transform Quality Q$_i$(n) based on the following equation:

$$Q_i(n)=F_i(n)*E_i(n).$$

The T$_i$(n) having the largest value S$_i$(n) shall be selected as the Group Principle Transform GP(n) by the Group Transform Selector 4170 of the Group Transform Scoring And Selection Circuit 4100 of FIG. 4A. Thus, in this exemplary embodiment, the inter-frame transform candidate T$_i$(n) with the highest score S$_i$(n) is selected as the Group Principle Transform GP(n) and then adaptively filtered to produce the Compensation Transform C(n) to compensate for jittery camera motion, in the DIS Compensation Unit (CU) 6000 of the DIS circuit of FIG. 1.

The History Score calculation Unit 4110 (e.g., 4110-1) stores the History of the Group Principle Transform GP(n) and calculates a History score H$_i$(n) for each T$_i$(n), e.g., seriatim when each T$_i$(n) is received from the Detection Unit (DU) 2000, based on a predetermined length HL of the stored History of the Group Principle Transform GP(n), wherein HL is a integer indicating a predetermined number of prior frames. The incoming T$_i$(n) is mathematically compared with each of the HL stored previously-selected Group Principle Transforms GP(n−1) . . . GP(n−k), wherein k is the integral frame-time index that ranges from one (denoting the immediately previous frame: n−1) to HK (the more timewise distant frame: n−HK). Transforms among T$_i$(n) having a higher correlation with the HL stored previously-selected Group Principle Transforms GP(n−1) through. GP(n−HL) have a higher History score H$_i$(n).

The correlation Hi,k(n) between T$_i$(n) and each GP(n−k) is unity minus the normalized norm (1−|T$_i$(n)−GP(n−k)|) in the range [0,1] wherein a value of Hi,k(n) equal to 1 indicates the highest correlation.

The contribution of each correlation Hi,k(n) (1−|T$_i$(n)−GP (n−k)|) is weighed by corresponding History-Weights HW(k).

The History score H$_i$(n) is the total correlation and is the HW(n−k) weighted sum of Hi,k(n), for 1<k<HL, where HL is the length (number of past frames) of the history. Thus, $$H_i(n)=\Sigma[1-|T_i(n)-GP(n-k)|*HW(k)], \text{ for } 1<k<HL.$$

The weights HW(n−HL) through HW(n−1) are preferably selected so that their sum equals one and so that the History score H$_i$(n) output is non-linearly normalized and has a continuous range [0,1].

The exemplary hardware implementation 4110-1 of History Score calculation Unit 4110, shown in FIG. 4B includes a FIFO (first-in-first-out) memory buffer for storing HL previous-selected Group Principle Transforms GP(n−1) through GP(n−HL) having HL taps (for n−1 through n−HL) for outputting their stored contents into a comparator 4114. The comparator 4114 compares the current T$_i$(n) with each of the HL stored previous-selected Group Principle Transforms GP(n−1) through GP(n−HL), and outputs each comparison weighted by history weights HW(n−1) through HW(n−HL) to the total History Score calculator 4116 which outputs the total correlation as total History score H$_i$(n) in the continuous range [0,1].

The Motion Score calculation Unit 4120 receives each T$_i$(n) and calculates its Motion score M$_i$(n) based only on T$_i$(n). In alternative embodiments, the Motion Score calculation Unit 4120 can be configured to receive stored information from the Detection Unit 2000 for the purpose of calculating the Motion score M$_i$(n). Transforms with small motion have a higher Motion score M$_i$(n) and are more likely to be the Group Principle Transform GP(n). For each inter-frame transform among T$_i$(n), the Motion Score calculation Unit 4120 calculates Motion score M$_i$(n).

A Mi(n) having a large value corresponds to small motion, and vice versa. Motion M$_i$(n) may be based on the horizontal, vertical, or total linear displacement of the transform. The Motion score Mi(n) is inversely related to the linear displacement, and is preferably non-linearly normalized to have a continuous range [0,1].

The Feature Score calculation Unit 4130 receives each T$_i$(n) and calculates its Feature score F$_i$(n) based only on T$_i$(n). In alternative embodiments, the Feature Score calculation Unit 4130 can be configured to receive stored information from the Detection Unit 2000 for the purpose of calculating the Feature score F$_i$(n). For each inter-frame transform among T$_i$(n), the Feature Score calculation Unit 4130 calculates Feature score F$_i$(n). Feature score F$_i$(n) correlates with the number of feature points grouped together to make up the feature point group represented by each inter-frame transform among T$_i$(n). Transforms among T$_i$(n) having more feature points per group have a higher Feature score F$_i$(n). Feature score Fi(n) is preferably non-linearly normalized having a continuous range [0,1].

The Extent Score calculation Unit 4140 receives each T$_i$(n) and calculates its Extent score E$_i$(n) based only on T$_i$(n). In alternative embodiments, the Extent Score calculation Unit 4140 can be configured to receive stored information from the Detection Unit 2000 for the purpose of calculating the Extent score E$_i$(n). For each inter-frame transform among T$_i$(n), the Extent Score calculation Unit 4140 calculates Extent score E$_i$(n). Transforms among T$_i$(n) having feature points covering (spread over) larger area are scored higher. Extent score E$_i$(n) having a larger value corresponds to a larger covered area, and vice versa. Extent score Ei(n) correlates to the height times width of the rectangular area containing all feature points of the group of the transform. The Extent score E$_i$(n) is preferably non-linearly normalized to have a continuous range [0,1].

Various exemplary embodiments of the inventive concept uses scene history analysis to exclude large objects moving across the entire scene that would otherwise cause undesirable results in video stabilization. Without proper scene history analysis, a principle transform selector is most likely to select the transform candidate corresponding to the large moving object, especially when it covers the entire scene. We recognize that when a large object moves across and fills the entire scene, the transform candidates T$_i$(n) do not include a Principle Transform P(n) that corresponds to the unsteady camera.

Figure 5:
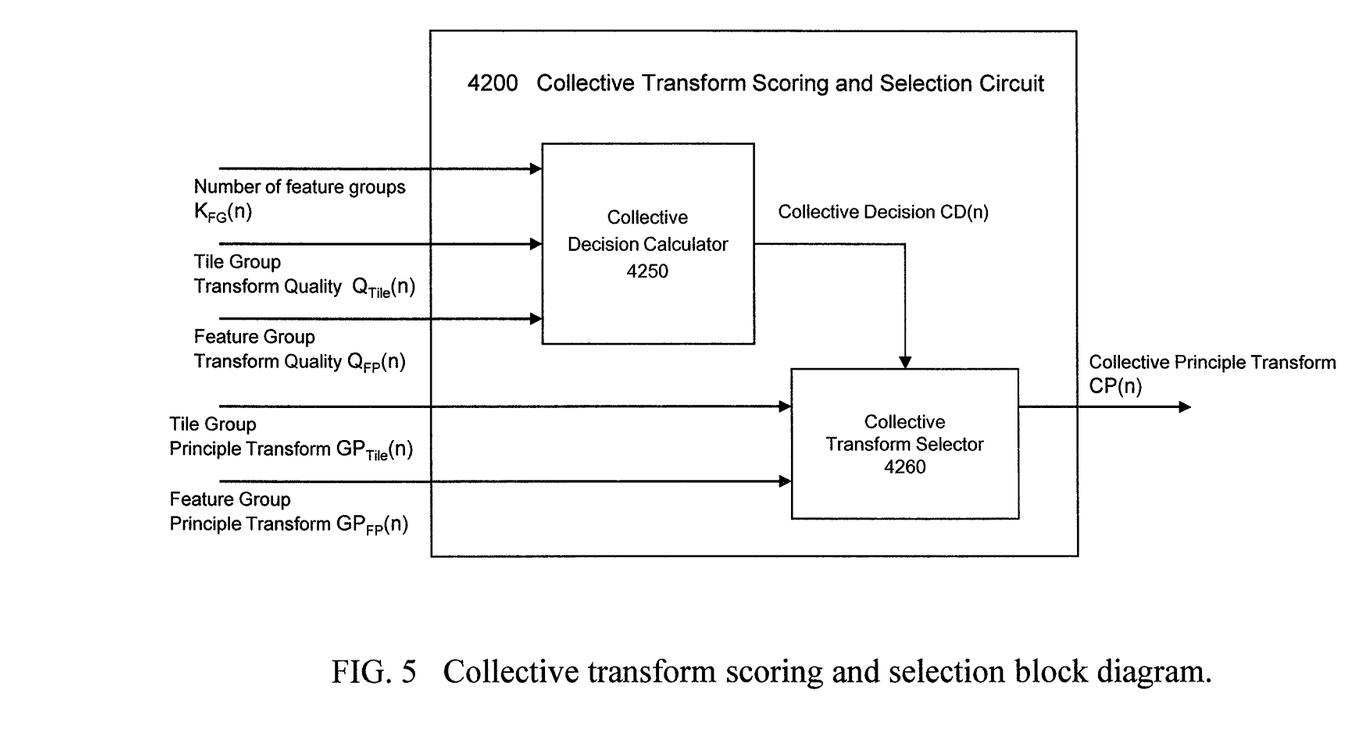
FIG. 5 is a block diagram of an exemplary implementation of a Collective Transform Scoring and Selection Circuit.

FIG. 5 is a block diagram of an exemplary implementation of the Collective Transform Scoring and Selection Circuit 4200 of the Trajectory Unit (TU) 4000 of the DIS circuit of FIG. 1, comprising a Collective Decision Calculator 4250 configured to calculate a Collective Decision CD(n), and a Collective Transform Selector 4260 configured to output a Collective Principle Transform CP(n) as steps in the DIS method of the DIS circuit of FIG. 1.

The Collective Decision Calculator 4250 in FIG. 5 calculates a Collective Decision CD(n) from the Feature Group Transform Quality $Q_{FP}(n)$, the Tile Group Transform Quality $Q_{Tile}(n)$, and the number of feature group transform candidates $K_{FG}(n)$ received from the Detection Unit (DU) 2000.

An exemplary implementation of the Collective Decision Calculator 4250 includes calculating a non-linearly normalized Fragmentation Measure $\Theta_F(n)$ from the number of feature groups $K_{FG}(n)$, such that $\Theta_F(n)$ is 0 when $K_{FG}(n)$ is small, and $\Theta_F(n)$ is 1 when $K_{FG}(n)$ is large. Thus, a $\Theta_F(n)$ value close to 1 indicates that all the feature points in the video scene are fragmented to many feature groups, and vice versa.

The Collective Decision Calculator 4250 outputs a Collective Decision CD(n) by comparing $Q_F(n)$ and $\Theta_F(n)*Q_T(n)$, and if $Q_F(n) > \Theta_F(n)*Q_T(n)$, then the Collective Decision CD(n) is set to select Feature Group. And, if $Q_F(n) <= \Theta_F(n)*Q_T(n)$, then the Collective Decision CD(n) is set to select Tile Group. In this formulation, if the feature groups are not fragmented, then $\Theta_F(n)$ is close to 0, and the Feature Group is more likely to be selected. Otherwise, if the feature groups are fragmented, then $\Theta_F(n)$ is close to 1, and the Tile Group Transform Quality $Q_{Tile}(n)$ is compared on equal grounds with the Feature Group Transform Quality $Q_{FP}(n)$.

The Collective Transform Selector 4260 performs selection between the Feature Group Principle Transform $GP_{FP}(n)$ and the Tile Group Principle Transform $GP_{Tile}(n)$. The Collective Transform Selector 4260 is controlled by the Collective Decision CD(n) such that the output Collective Principle Transform CP(n) is set to Feature Group Principle Transform $GP_{FP}(n)$ when CD(n) is set to Feature Group, and to Tile Group Principle Transform $GP_{Tile}(n)$ otherwise.

In this embodiment, the Collective Transform Scoring and Selection Circuit 4200 performs selections based on Feature Group Transform Quality $Q_{FP}(n)$ and Tile Group Transform Quality $Q_{Tile}(n)$. These group transform qualities are calculated by the transform Quality calculator 4160 of FIG. 4A, which receives inputs from the Feature Score calculation Unit 4130 and the Extent Score calculation Unit 4140.

The Feature Score calculation Unit 4130 calculates its Feature score $F_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. For each inter-frame transform among $T_i(n)$, the Feature Score calculation Unit 4130 calculates Feature score $F_i(n)$. Transforms $T_i(n)$ with more feature points in a group or more tiles in a group will have a higher Feature Score $F_i(n)$, and results in higher Feature Group Transform Quality $Q_{FP}(n)$ or Tile Group Transform Quality $Q_{Tile}(n)$, respectively. In some embodiments, the number of feature points per tile may govern the score Feature score $F_i(n)$ of feature-based transforms $T_i(n)$. In other embodiments, the number of tiles may govern the score Feature score $F_i(n)$ of tile-based transforms $T_i(n)$. The number of feature points per tile, and/or the number of tiles in each group of tile vectors can be obtained directly from the Detection Unit 2000.

The Extent Score calculation Unit 4140 calculates the Extent score $E_i(n)$ of feature-based and tile-based transforms $T_i(n)$. In this embodiment, the Feature Score calculation Unit 4130 is configured to receive stored information from the Detection Unit 2000 for the purpose of calculating the Feature score $F_i(n)$. Transforms with feature points or tiles covering larger area are scored higher. The number of feature number and dimensions of the tiles in each group of tile vectors can be obtained directly from the Detection Unit 2000. Similarly, the horizontal and vertical extent of each group of feature-based motion vectors can be obtained directly from the Detection Unit 2000. Feature groups covering a larger area or tile group covering a larger area will have a higher Extent Score $E_i(n)$, and results in higher Feature Group Transform Quality $Q_{FP}(n)$ or Tile Group Transform Quality $Q_{Tile}(n)$, respectively. In this embodiment, the Extent Score calculation Unit 4140 is configured to receive stored extent information from the Detection Unit 2000 for the purpose of calculating the Extent score $E_i(n)$.

After the Collective Principle Transform CP(n) has been selected by the Collective Transform Scoring and Selection Circuit 4200, the Large Object Exclusion Hardware decides whether the selected Collective Principle Transform CP(n) is or is not a large moving object moving into and covering the entire scene. When such exclusion is in effect, a Unity Transform (UT) is created to substitute and serve as the selected Principle Transform P(n) for the compensation circuit of the DIS system, so that the stabilized video will not incorrectly or unnecessarily follow the transform of the large moving object.

According to one embodiment of the present inventive concept, the moving object exclusion method is activated based on two observations: a pre-existed stationary background (indicated by the history of P(n)); and a time-period of co-existence of the stationary background and the large moving object.

The moving object exclusion method can be highly effective in dealing with the following scenario: The scene has a mostly stationary background with or without moving objects; A large moving object enters the scene, and progressively covers larger area; The large moving object covers the entire scene; The large moving object starts leaving the scene, and the background starts to reappear; The large moving object eventually moved away.

The moving object analyzer detects the exclusion scenario IF:

consecutive stationary MV Group existence indicates an existed scene with mostly stationary background;
increasing count of consecutive similar-speed MV Groups indicates an object is moving into the scene;
the trend continues, and at time n the consecutive similar-speed MV Groups cover the entire scene and the stationary MV Group ceased to exist, then the exclusion scenario is detected The Exclusion Decision ED(n) is sent to the Exclusion Transform Selector. The Exclusion Transform Selector selects the Collective Principle Transform CP(n) unless ED(n) indicates the exclusion scenario, in which event then the Principle Transform P(n) is set to Unity Transform. Thus, the stabilized video will not incorrectly follow a large moving object even when it covers the entire scene.

Figure 6:
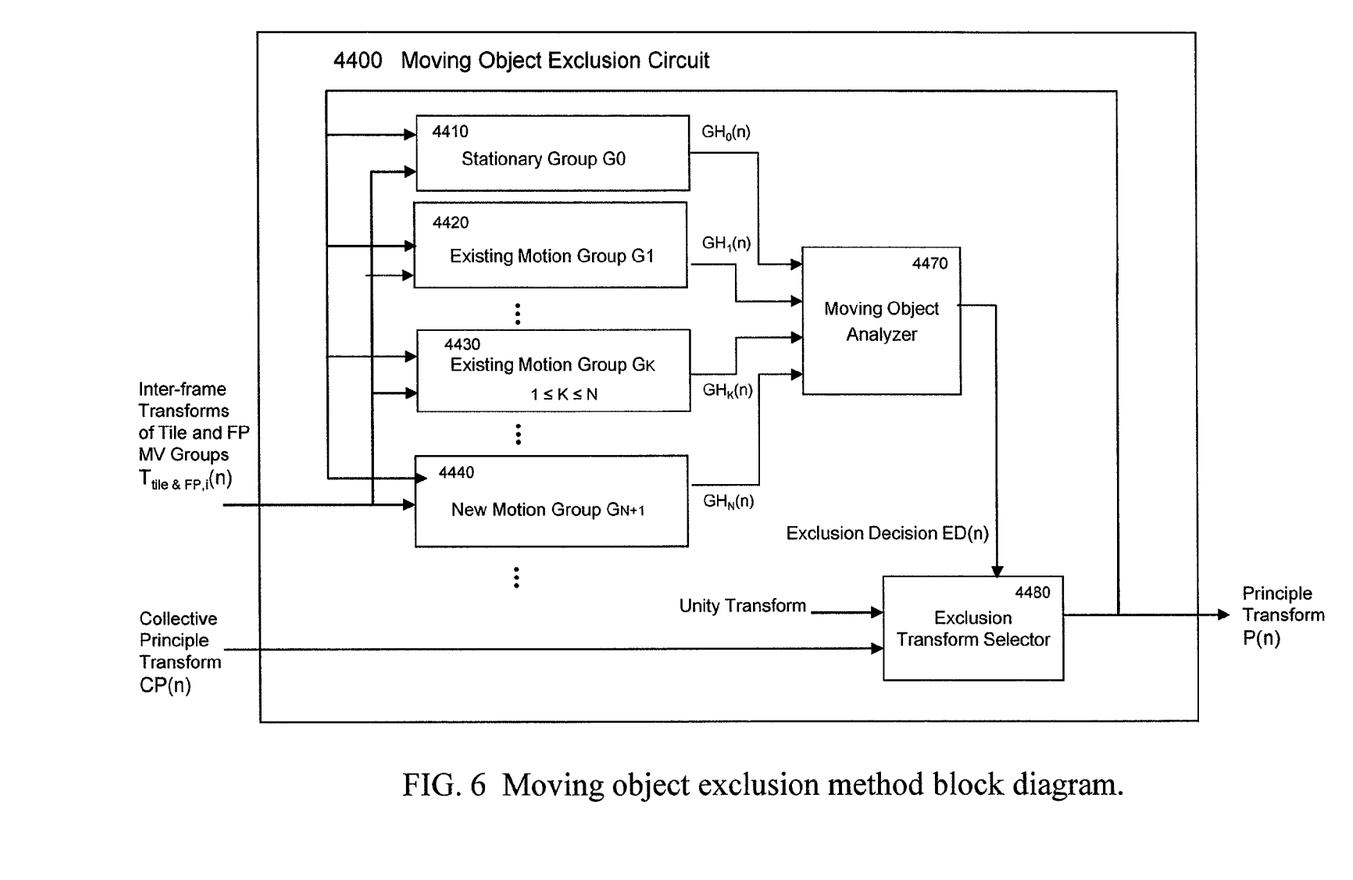
FIG. 6 is a block diagram illustrating an exemplary implementation of the Moving Object Exclusion Circuit.

FIG. 6 is a block diagram of an exemplary implementation of the Moving Object Exclusion Circuit 4400 of the Trajectory Unit (TU) 4000 of the DIS circuit of FIG. 1, comprising a Moving Object Analyzer 4470 and an Exclusion Transform Selector 4480 configured to perform a step in the DIS method of the DIS circuit of FIG. 1.

The Moving Object Exclusion Circuit 4400 comprises a plurality of Group History circuits 4410, 4420, 4430, 4440 for storing a scene's history, and a Moving Object Analyzer 4470. At any time, there is only one designated stationary group $G_O$, but there can be zero or more existing motion groups $G_k$, where k>0. There may also be a new motion group GN, which will during the next frame become one of the k (e.g., k(n+1)=k(n)+1) existing motion groups $G_k$.

The stationary group $G_0$ has an associated group history $GH_0$. Each of the k existing motion groups $G_k$ has an associated group history $GH_k$, as well as an associated motion vector $M_k$. Each existing motion group $G_K$ has a Motion Vector $M_K$, which is basically low-pass filtered $|T_i(n)|$ for each similar-speed $T_i(n)$ over time up to frame n.

Each new motion group $G_N$ has an associated group history $GH_N(n)$ which is initialized at the time of its creation. The Moving Object Analyzer 4470 receives the scene history comprised of the plurality of Group Histories $GH_0(n)$, $GH_1(n)$, . . . $GH_j(n)$, and $GH_K(n)$ and $GH_N(n)$, and from them computes an Exclusion Decision ED(n).

The Exclusion Transform Selector 4480 performs selection between the Unity Transform (UT) and the Collective Principle Transform CP(n). The Exclusion Transform Selector 4480 is controlled by the Exclusion Decision ED(n) such that the output Principle Transform P(n) is set to Unity Transform (UT) when ED(n) is activated, and to the Collective Principle Transform CP(n) otherwise. A Unity Transform (UT) will cause the Compensation Unit to do nothing during compensation. Thus, when the Moving Object Analyzer 4470 detects the "large moving object" scenario and activates the Exclusion Decision ED(n), the large moving object's transform which might otherwise be selected as the Principal transform P(n) is excluded from being the selected Principle transform P(n). In effect, the transform of a large moving object, when detected, is excluded from the compensation performed by the Compensation Unit 6000 of FIG. 1.

Figure 7:
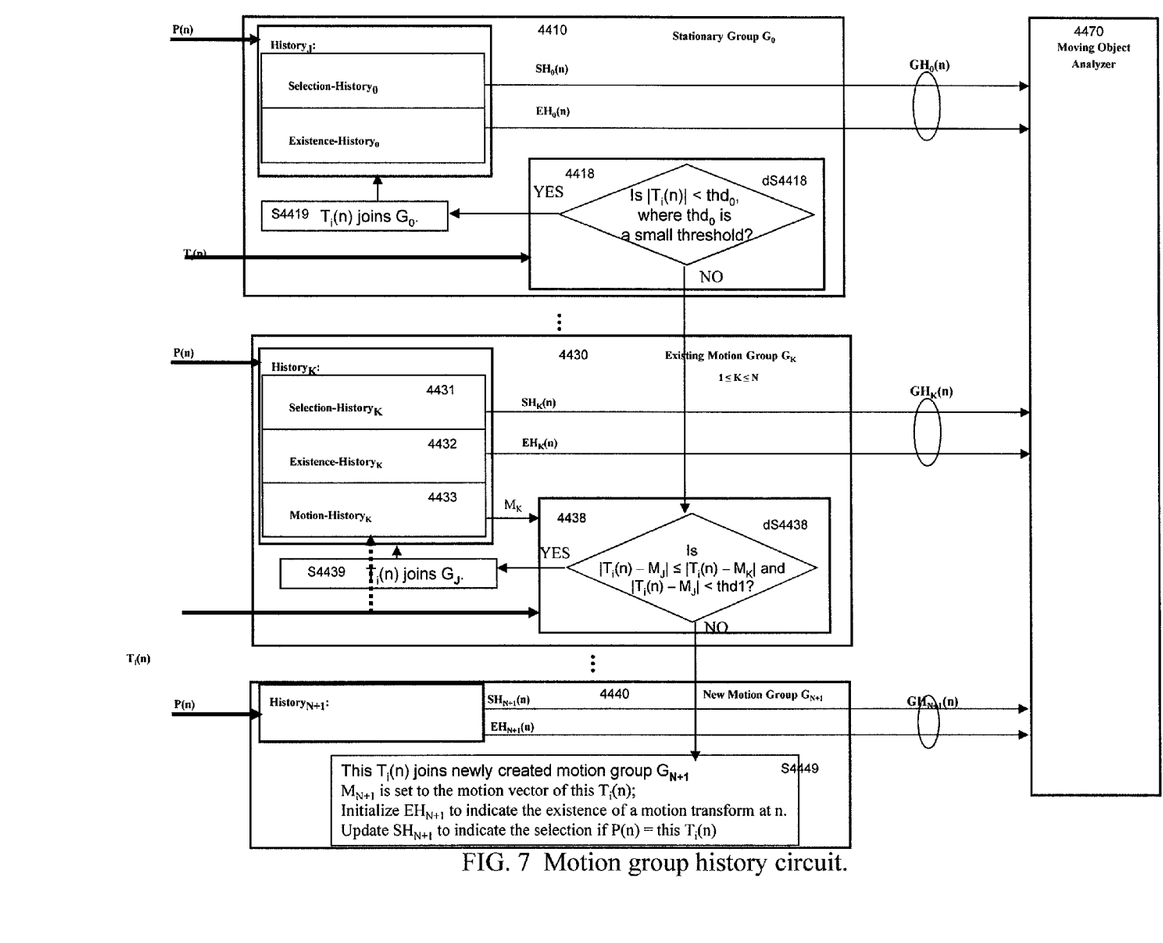
FIG. 7 is a flow chart illustrating process steps according to an embodiment of the present inventive concept.

FIG. 7 is a hybrid block diagram—flow chart illustrating details of steps performed in an exemplary implementation of the Motion Group History Circuits in the Moving Object Exclusion Circuit 4400 of FIG. 6, configured to perform steps in the DIS method of the DIS circuit of FIG. 1. FIG. 7 illustrates details of representative Group History circuits 4410, 4430, and 4440 corresponding to the stationary Group $G_0$, existing motion group $G_K$, and newly created motion group $G_{N+1}$ respectively.

Each of the Group Histories (e.g., $H_0(n)$) received from Group History circuits (e.g., 4410) by the Moving Object Analyzer 4470 of the Moving Object Exclusion Circuit 4400 of FIG. 6 includes two species of history data, Selection-History (e.g., $SH_0(n)$) and Existence-History (e.g., $EH_0(n)$) corresponding to each group.

Moving Object Analyzer 4470 detects the exclusion scenario as follows: Consecutive existence and selections indicated in group history GH0 of the stationary transform G0(n) indicates that a scene with mostly stationary background has existed for a number of frames; A progressively increasing number of consecutive existences in the group history $GH_K$ of a particular motion group $G_K$ indicates that an object is moving into the scene; If this trend of existences and motion continues, and if at time (n) no stationary transform joins G0 but the selected transform P(n) joins $G_K$, then the large moving object scenario is detected, and the activated Exclusion Decision ED(n) is sent to the Principle Transform Selector 4160-2. If ED(n) indicates the large object exclusion scenario, then the Principle transform P(n) is set to Unity Transform, otherwise, the Principal transform P(n) is selected according to some scoring function of Ti(n).

Each of the Group History circuits 4410, 4420, 4430, 4440 performs storage and processing of three species of history information for each group associated with one of the received inter-frame Transforms $T_i(n)$. The three species of group history are Selection-History, and Existence-History, and Motion-History. The stationary group $G_0$ is created with an empty history at video stabilization startup. The Motion History of the stationary group $G_0$ may be omitted, and presumed null. The motion groups ($G_1$, . . . , $G_K$, . . . , $G_N$) are created or deleted dynamically during the course of DIS video processing.

Referring to FIG. 7 Group History circuits 4410, 4430, and 4440 corresponding to the stationary Group $G_0$, N existing motion group $G_K$, and newly created motion group $G_{N+1}$ respectively, provide group histories $GH_0$, $GH_K$ and $GH_{N+1}$.

Group History circuit 4410 of the motion group $G_0$ includes a History$_0$ memory for storage of Selection-History $SH_0$, and Existence-History $EH_0$. Existence-History $EH_0$, is a one-bit per past frame value that indicates whether or not an Inter-frame Transform $T_i(n)$ has joined the motion group $G_0$ in the previous frames. Selection-History $SH_0$ is a one-bit per past frame value that indicates whether or not the Inter-frame Transform $T_i(n)$ that joined the motion group $G_0$ was selected as the Principal transform P(n) in the previous frames.

The Group History circuit 4410 of the stationary group $G_0$ omits Motion-History $M_0$ because a decision (decision step dS4418) whether any $T_i(n)$ including the selected Principal transform P(n) joins the stationary group $G_o$ depends upon comparing $T_i(n)$ with a threshold value thd$_0$ rather than with a variable history-based Motion vector $M_0$, because group $G_0$ is deemed stationary. The stationary group $G_0$ is created with an empty history at video stabilization startup.

If during frame n a $T_i(n)$ satisfies $|T_i(n)|<thd_0$, (YES branch of decision step dS4418), then:

This $T_i(n)$ joins $G_0$;

Existence-History $EH_0$ is updated to indicate the existence of a stationary transform at frame n; and, if P(n)=his $T_i(n)$, then Selection-History $SH_0$ is updated to indicate the selection of this $T_i(n,)$.

Otherwise, (NO branch of decision step dS4418) during frame those $T_i(n)$ which do not satisfy $|T_i(n)|<thd_0$, are compared with Group History in each of the existing motion groups $G_1$ to $G_N$.

Group History circuit 4430 of the motion group $G_K$ includes a History$_K$ memory for storage of Selection-History $SH_K$, and Existence-History $EH_K$, and Motion-History $M_K$. Existence-History $EH_K$, is a one-bit per past frame value that indicates whether or not an Inter-frame Transform $T_i(n)$ has joined the motion group $G_K$ in the previous frames. Selection-History $SH_K$ is a one-bit per past frame value that indicates whether or not the Inter-frame Transform $T_i(n)$ that joined the motion group $G_K$ was selected as the Principal transform P(n) in the previous frames.

Motion-History $M_K$ stores information indicating the vector $M_K$ of the overall motion of the group $G_K$. Each $T_i(n)$ also maps to a motion vector M. Each motion group $G_K$ maps to a motion vector $M_K$. Let $|T_i(n)|$ be the size of the motion vector of $T_i(n)$, and $|T_i(n)-M_K|$ the deviation of $T_i(n)$ from the motion vector $M_K$ of the existing motion group $G_K$ for $1 \leq K \leq N$, where N is the number of currently existing motion groups. A motion group $G_J$ among the N existing motion groups having the minimum $|T_i(n)-M_J|$ indicates a best matching group $G_J$ for $T_i(n)$. This joining decision may be determined by comparing $|T_i(n)-M_J|$ with a predetermined threshold value thd$_1$. Thus, for example, in decision step dS4438, if $|T_i(n)-M_J| \leq |T_i(n)-M_K|$ for a particular J and all K between 1 and N, and $|T_i(n)-M_J|<thd_1$, (YES branch of decision step dS4438) then this $T_i(n)$ joins the existing motion group $G_J$.

If $|T_i(n)-M_J| \leq |T_i(n)-M_K|$ for all K and $|T_i(n)-M_J| < thd_1$, (YES branch of decision step dS4438) then:

$T_i(n)$ joins $G_J$;

Motion-History $M_J$ is adjusted to reflect the newly joined $T_i(n)$;

Existence-History $EH_J$ is updated to indicate the existence of the motion group $G_J$ at frame n;

if $P(n)=$this $T_i(n)$, then Selection-History $SH_J$ is updated to indicate the selection of this $T_i(n,)=P(n)$.

On the other hand, if after decision step dS4438 has been repeated for a $T_i(n)$ and for all existing motion groups ($G_1$ through $G_N$) and none of the $M_K$ satisfies $|T_i(n)-M_K| < thd_1$, (NO branch of decision step dS4438) then this $T_i(n)$ joins newly created motion group $G_{N+1}$ (step S4449). If this $T_i(n)$ joins newly created motion group $G_{N+1}$ (step S4449), then:

$T_i(n)$ joins the newly created motion group $G_{N+1}$;

Motion-History $M_{N+1}$ is set to the motion vector of this $T_i(n)$;

Existence-History $EH_{N+1}$ is initialized to indicate the existence of the new motion group $G_{N+1}$ at frame n; and if $P(n)=$this $T_i(n)$, then Selection-History $SH_{N+1}$ is updated to indicate the selection of this $T_i(n,)=P(n)$.

Any motion group (among $G_0$ through $G_J$) without any $T_i(n)$ joining for an extended period of time (frames) will be deleted.

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of processing video data, comprising:
   receiving from a motion capturing circuit a first frame and a second frame;
   dividing the first frame into a plurality of pixel blocks having a first size;
   calculating motion vectors of each of the first-size pixel blocks between the first frame and the second frame;
   grouping proximal motion vectors to identify first groups of motion vectors, wherein each identified group among the first groups of motion vectors corresponds to one or more objects or to a portion of one or more objects in a scene;
   calculating an affine transform Ti(n) for each identified group among the first groups of motion vectors, wherein Ti(n) is the affine transform of the ith group, where n denotes its time sequence position;
   calculating a number of selected points within an extent of the affine transform Ti(n) of each group among the first groups of motion vectors; and
   identifying a first-group principal transform candidate by selecting among the affine transforms Ti(n) of first groups of motion vectors using scoring functions, wherein the scoring functions include at least one of transform-point-number scores and transform-extent scores,
   wherein the first-group principal transform candidate is a first candidate for selection as a principal transform P(n) of the scene.

2. The method of claim 1, further comprising:
   dividing the first frame into a plurality of pixel blocks having a second size, wherein each of the second-size pixel blocks has a motion vector between the first frame and the second frame, and wherein the pixel blocks include second size tiles;
   calculating the motion vector of each of the second-size tiles between the first frame and the second frame;
   grouping the motion vectors of the second-size tiles to identify second groups of motion vectors;
   calculating an affine transform Ti(n) for each identified group among the second groups of motion vectors;
   calculating a number of selected points within an extent of the affine transform Ti(n) of each group among the second groups of motion vectors;
   identifying a second-group principal transform candidate by selecting among the affine transforms Ti(n) of second groups of motion vectors using the scoring functions, wherein the second-group principal transform candidate is a second candidate for selection as the principal transform P(n) of the scene.

3. The method of claim 2, wherein the scoring functions include transform-history scores, and at least one of transform-motion scores, transform-point number scores, and transform-extent scores.

4. The method of claim 2, wherein the scoring functions include transform-motion scores and at least one of transform-history scores, transform-point number scores, and transform-extent scores, and wherein the transform-motion scoring function comprises calculating:
   a transform-motion score Mi(n) Ti(n) being the horizontal linear displacement of the transform, wherein the transform-motion score Mi(n) is non-linearly normalized within the range [0,1].

5. The method of claim 2, wherein the scoring functions include transform-point number scores and at least one of transform-history scores, transform-motion scores, and transform-extent scores, and wherein the transform-point scoring function comprises calculating:
   a transform-point score Fi(n) of Ti(n) being the number of feature points associated with the transform, wherein the transform-point score Fi(n) is non-linearly normalized within a range [0,1].

6. The method of claim 2, wherein the scoring functions include transform-extent scores and at least one of transform-history scores, transform-motion scores, and transform-point number scores, and wherein the function of transform-extent comprises calculating:
   a transform-extent score Ei(n) of Ti(n) is the area covered by the featurepoints in the transform, wherein the transform-extent score Ei(n) is non-linearly normalized within a range [0,1].

7. The method of claim 1, wherein the scoring functions include a transform-history score Hi(n), transform-motion score Mi(n), transform-point number score Fi(n), and transform-extent score Ei(n), wherein the affine transform Ti(n) having the highest combination of at least two of the scoring functions Hi(n), Mi(n), Fi(n) and Ei(n) is deemed transform Ti(n), and transform Ti(n) is selected as the principal transform P(n).

8. The method of claim 7, further including processing the principal transform P(n) to compensate for camera movement.

9. The method of claim 1, further including identifying a large moving object in the scene and excluding a selected principal transform P(n) when it corresponds to the large moving object.

10. The method of claim 9, Wherein the identifying the large moving object comprises comparing an existed motion group's history and an existed stationary group's scene history with respect to each affine transform Ti(n).

11. The method of claim 2, further including selecting the principal transform P(n) from among tile vector transforms Ti(n)$_{TV}$ when a calculated transform quality Qi(n) of Ti(n) is less than a preset threshold, wherein the transform quality Qi(n) is based upon the number of feature points associated with a feature point transform Ti(n)$_{FP}$ and upon the extent of the feature point transform Ti(n)$_{FP}$.

12. An image processing circuit, comprising:
a first memory configured to store first groups of motion vectors of a scene based on pixel blocks having a first size and to store second groups of motion vectors of the scene based on pixel blocks having a second size; and
a detection unit including an affine transform calculator configured to calculate an affine transform Ti(n) for each group among the first groups of motion vectors and an affine transform Ti(n) for each group among the second groups of motion vectors, wherein Ti(n) is the affine transform of the ith group, where n denotes its time sequence position; and
calculate a number of selected points within an extent of the affine transforms Ti(n) of each group among the first groups of motion vectors and the second groups of motion vectors, wherein the first memory is configured to store the number of selected points within the extent of the affine transforms Ti(n) of each group among the first groups of motion vectors and the second groups of motion vectors;
a trajectory unit configured to identify a first-group principal transform candidate by selecting among the affine transforms Ti(n) of the first motion vector groups using scoring functions, wherein the scoring functions include at least two of transform-history scores, transform-motion scores, transform-point number scores, and transform-extent scores, wherein the first-group principal transform candidate is a first candidate for selection as the principal transform P(n) of the scene; and
identify a second-group principal transform candidate by selecting among the affine transforms Ti(n) of the second groups of motion vectors of pixel blocks having a second size using the scoring functions, wherein the second-group principal transform candidate is a second candidate for selection as a principal transform P(n) of the scene.

13. The image processing circuit of claim 12,
wherein the pixel blocks having the second size are tiles, and
wherein the first groups of motion vectors are groups of feature point motion vectors having transforms Ti(n)$_{FP}$ among Ti(n), and
wherein the second group of motion vectors are groups of non-overlapping tile motion vectors having transforms Ti(n)$_{TV}$ among Ti(n), wherein Ti(n) is the ith transform, where n denotes its time sequence nature, wherein subscript FP indicates 'transform of a FeaturePoint-based motion-vector group', and wherein subscript TV indicates 'transform of a Tile motion-Vector group'.

14. The image processing circuit of claim 13, wherein the function of transform-history function comprises:
calculating a correlation Hi,k(n) between Ti(n) and GP(n−k) based on a difference (1−|Ti(n)−GP(n−k)|), wherein the transform-history score Hi(n) of Ti(n) is total correlation being the weighted sum of Hi,k(n) for all i between 1 and a predetermined length HL of the transform-history, wherein GP(n−k) is a previously selected group principle transform and k is the integral frame-time index that ranges from one (denoting the immediately previous frame: n−1) to HK (the most timewise distant frame: n−HK).

15. The image processing circuit of claim 13, wherein the transform-motion scoring function comprises:
a transform-motion score Mi(n) of Ti(n) being the horizontal linear displacement of the affine transform Ti(n), wherein the transform-motion score Mi(n) is non-linearly normalized within the range [0,1].

16. The image processing circuit of claim 13, wherein the transform-point scoring function comprises calculating:
a transform-point score Fi(n) of Ti(n) being the number of feature points associated with the transform, wherein the transform-point score Fi(n) is non-linearly normalized within the range [0,1].

17. The image processing circuit of claim 13, wherein the transform-extent scoring function comprises calculating:
a transform extent score Ei(n) of Ti(n) being the area covered by the featurepoints in the affine transform Ti(n), wherein the transform-extent score Ei(n) is non-linearly normalized within the range [0,1].

18. The image processing circuit of claim 12, wherein the affine transform Ti(n) having the highest combination of the at least two of the scoring functions transform-history score Hi(n), transform-motion score Mi(n), transform-point score Fi(n) and transform extent score Ei(n) is selected as the principal transform P(n).

19. The image processing circuit of claim 18, further including processing the principal transform P(n) to compensate for camera movement.

20. The image processing circuit of claim 12, further including identifying a large moving object in the scene and excluding a principal transform P(n) corresponding to the large moving object.

21. The image processing circuit of claim 20, wherein the identifying the large moving object comprises comparing an existed motion group's history and an existed stationary group's scene history with each Ti(n).

22. The image processing circuit of claim 13, further including selecting the principal transform P(n) from among Ti(n)$_{TV}$ when a confidence score based on the number of feature points in a feature point group having transform of Ti(n)$_{FP}$ and based on the extent of the feature point group having transform of Ti(n)$_{FP}$ is less than a preset threshold.

23. The image processing circuit of claim 20, wherein a principle transform is excluded when:
consecutive stationary motion vector group existence indicates an existed scene with mostly stationary background;
an object having consecutive similar-speed motion vector groups is detected to be moving into the scene;
at time n the consecutive similar-speed motion vector groups cover the entire scene and
the stationary motion vector group ceases to exist.

24. The method of claim 2, further comprising
identifying feature points (FP) in the first frame as the selected points;
wherein identifying the first groups of motion vectors comprises grouping motion vectors of the first-size pixel blocks that contain one of the identified feature points (FP);
wherein the motion vectors of the first groups of motion vectors include groups of feature point (FP) motion vectors, and wherein the first groups of motion vectors include transforms Ti(n)$_{FP}$ among transforms Ti(n), wherein subscript FP indicates 'transform of a Feature-Point-based motion-vector group'.

* * * * *